US010836049B2

(12) United States Patent
Seo

(10) Patent No.: US 10,836,049 B2
(45) Date of Patent: Nov. 17, 2020

(54) WORKPIECE GRIPPING DEVICE

(71) Applicant: SMC CORPORATION, Chiyoda-ku (JP)

(72) Inventor: Takeshi Seo, Nagareyama (JP)

(73) Assignee: SMC CORPORATION, Chiyoda-ku (JP)

(*) Notice: Subject to any disclaimer, the term of this patent is extended or adjusted under 35 U.S.C. 154(b) by 0 days.

(21) Appl. No.: 16/614,183

(22) PCT Filed: Apr. 11, 2018

(86) PCT No.: PCT/JP2018/015180
§ 371 (c)(1),
(2) Date: Nov. 15, 2019

(87) PCT Pub. No.: WO2018/211867
PCT Pub. Date: Nov. 22, 2018

(65) Prior Publication Data
US 2020/0086506 A1    Mar. 19, 2020

(30) Foreign Application Priority Data
May 18, 2017  (JP) ................................ 2017-099079

(51) Int. Cl.
*B25J 15/12*    (2006.01)

(52) U.S. Cl.
CPC .................................... *B25J 15/12* (2013.01)

(58) Field of Classification Search
CPC .... B25J 15/12; B25J 15/0206; B25J 15/0028;
Y10S 901/38; Y10S 901/39
See application file for complete search history.

(56) References Cited

U.S. PATENT DOCUMENTS 3,202,449 A  *  8/1965  Lemelson ............ B25J 15/0213
                                                            294/198
3,896,526 A  *  7/1975  Joiner .................... B42D 17/00
                                                            24/67.1

(Continued)

FOREIGN PATENT DOCUMENTS

JP       60-167689 U     11/1985
JP      2011-245566 A    12/2011
JP        2013-857 A      1/2013

OTHER PUBLICATIONS

International Search Report and Written Opinion dated Jul. 16, 2018 in PCT/JP2018/015180 filed Apr. 11, 2018.

(Continued)

*Primary Examiner* — Stephen A Vu
(74) *Attorney, Agent, or Firm* — Oblon, McClelland, Maier & Neustadt, L.L.P.

(57) ABSTRACT

A workpiece gripping device includes a gripping member and a holding member. The gripping member includes a pair of extension parts that protrude from a base part and face each other with a space therebetween where the plate-shaped part of the workpiece can be inserted, and is deformable so that at least parts of the extension parts approach each other or are separated from each other. The holding member includes a slit for holding the gripping member slidably along a direction in the extension parts protrude, can make the extension parts approach each other by housing at least parts of the extension parts in the slit, and can make the extension parts be separated from each other by projecting at least parts of the extension parts from the slit.

10 Claims, 6 Drawing Sheets

(56) References Cited

U.S. PATENT DOCUMENTS

| | | | | |
|---|---|---|---|---|
| 4,315,424 A | * | 2/1982 | Jarman | B21D 25/04 24/523 |
| 6,862,780 B2 | * | 3/2005 | Henry | A47F 5/0884 211/48 |
| 8,303,007 B2 | * | 11/2012 | Fukano | B25J 15/0273 269/240 |
| 9,075,031 B2 | * | 7/2015 | Jones | G01N 35/0099 |

OTHER PUBLICATIONS

Japanese Office Action dated Aug. 29, 2019 in Japanese Patent Application No. 2017-099079 (with English translation), 12 pages.

* cited by examiner

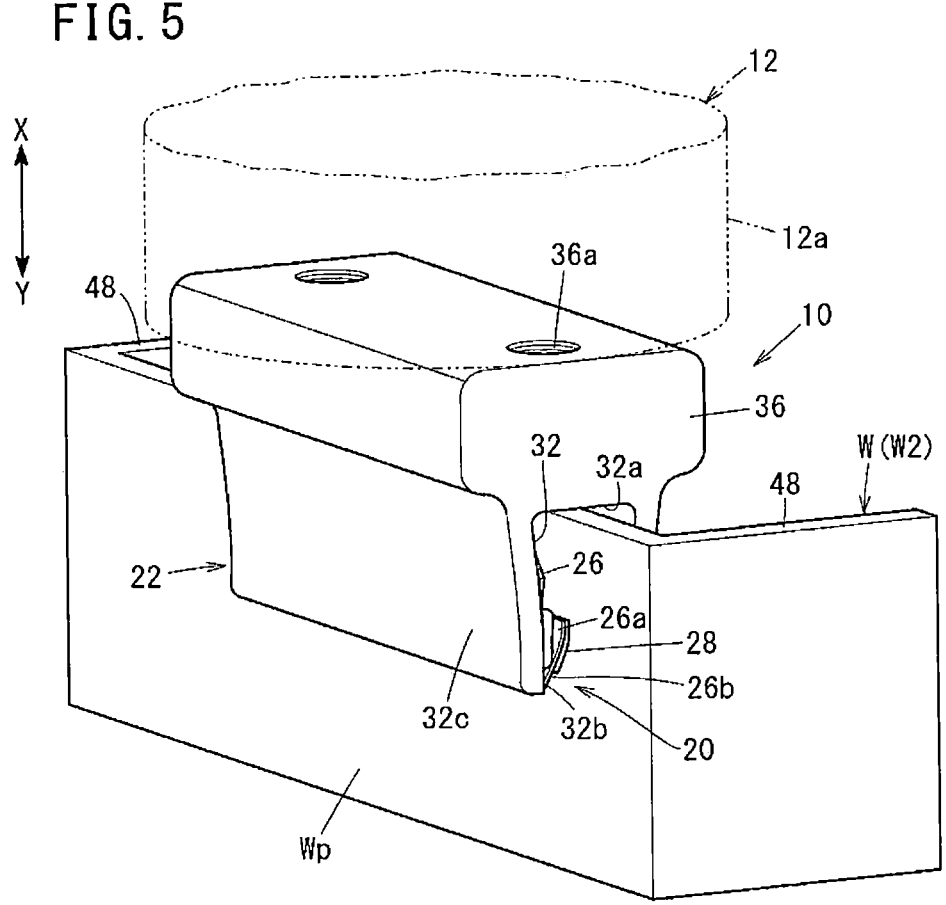

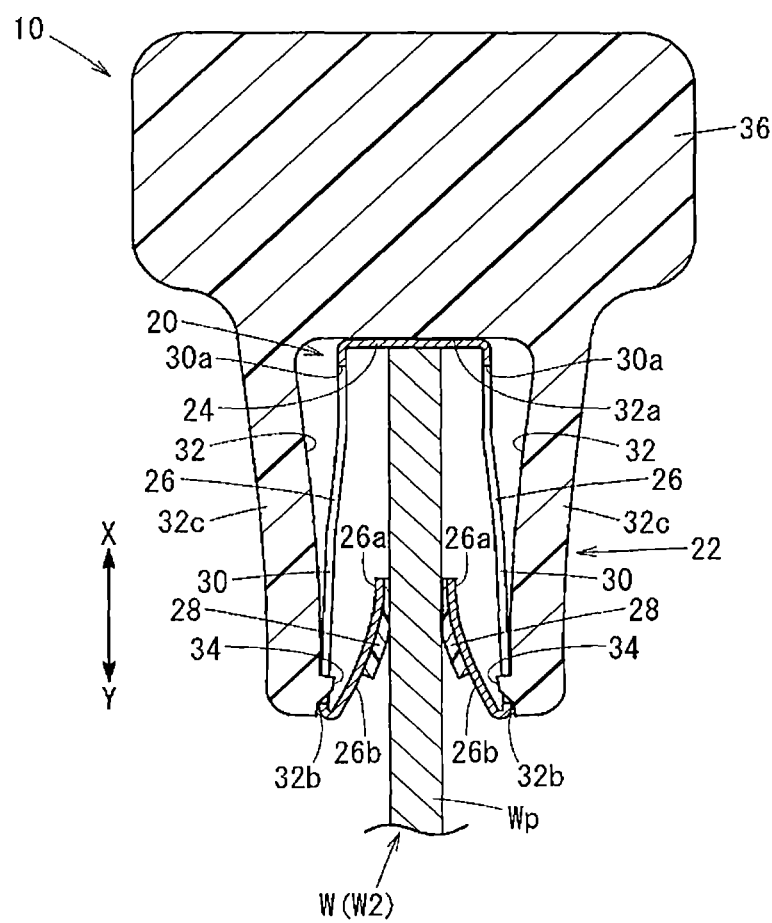

WORKPIECE GRIPPING DEVICE

TECHNICAL FIELD

The present invention relates to a workpiece gripping device that is attached to a robot and used.

BACKGROUND ART

Conventionally, in order to improve production efficiency, at least a part of each process in a production line has been automated and a robot carries out certain work. For example, in order to take a workpiece out of a predetermined place and transport the workpiece to another place, a robot has a workpiece gripping device (what is called a robot hand) (for example, see Japanese Laid-Open Patent Publication No. 2013-000857).

SUMMARY OF INVENTION

Conventional workpiece gripping devices have been unable to grip workpieces with various shapes including a plate-shaped member, such as a sheet metal component. For example, the workpiece gripping device according to Japanese Laid-Open Patent Publication No. 2013-000857 can grip workpieces with various sizes, but cannot grip workpieces with various shapes.

A main object of the present invention is to provide a workpiece gripping device that can grip workpieces with various shapes including a plate-shaped part in at least a part thereof.

According to one embodiment of the present invention, the present invention provides a workpiece gripping device attached to a robot and used for gripping a workpiece, the workpiece including a plate-shaped part in at least a part thereof, and the workpiece gripping device includes: a gripping member including a pair of extension parts that protrude from a base part and face each other with a space therebetween where the plate-shaped part of the workpiece is configured to be inserted, the gripping member configured to be deformed so that at least parts of the extension parts approach each other or are separated from each other; and a holding member including a slit configured to hold the gripping member slidably along a direction in which the extension parts protrude, the holding member configured to make the extension parts approach each other by housing at least parts of the extension parts in the slit, and make the extension parts be separated from each other by projecting at least parts of the extension parts from the slit, wherein the plate-shaped part is configured to be gripped between the extension parts that have approached each other.

In the workpiece gripping device with the above structure, by projecting at least parts of the extension parts from the slit, the space between the extension parts can secure a size where the plate-shaped part of the workpiece can be inserted. On the other hand, when at least parts of the extension parts are housed in the slit, a state where the extension parts are close to each other can be maintained.

Therefore, when the plate-shaped part of the workpiece is inserted between the extension parts that are projected from the slit and separated from each other and the extension parts are housed in the slit by moving the gripping member and the holding member relative to each other, the plate-shaped part can be gripped between the extension parts.

Therefore, this workpiece gripping device can grip workpieces with various shapes including a plate-shaped part in at least a part thereof.

In the workpiece gripping device, it is preferable that each of the extension parts may include a slip preventing part on a part configured to grip the plate-shaped part. In this case, a friction force that is generated between the extension part and the plate-shaped part can be increased by the slip preventing part; therefore the plate-shaped part of the workpiece can be gripped more appropriately.

In the workpiece gripping device, it is preferable that each of the pair of extension parts may include a part where a distance between the extension parts is larger toward a tip end side in the protruding direction when the pair of extension parts is projected from the slit. In this case, since the distance between the extension parts projecting from the slit can be made larger on the tip end side, the plate-shaped part can be easily inserted from the tip end side to a base end side.

In the workpiece gripping device, it is preferable that: the gripping member may be configured to be elastically deformed so that the extension parts approach each other or are separated from each other; and the extension parts may be configured to approach each other when at least parts of the extension parts are housed in the slit against an elastic force of the gripping member. In this case, the extension parts can approach each other or be separated from each other easily with a simple structure.

In the workpiece gripping device, it is preferable that: a tip end side of each of the pair of extension parts in the protruding direction may be provided with a folded part that is folded to the space between the extension parts; the folded parts of the pair of extension parts may extend in a direction of approaching each other from the tip end side to a base end side in the protruding direction, and be configured to be elastically deformed in a direction where the folded parts are separated from each other; and the plate-shaped part is configured to be gripped between the folded parts.

That is to say, each of the folded parts is provided to form a shape like a letter of V with the tip end side of the extension part. In this case, in a state that the plate-shaped part of the workpiece is held between the folded parts, the tip end sides of the extension parts approach each other to elastically deform the folded parts. This can cause the folded parts to energize the plate-shaped part. As a result, the plate-shaped part of the workpiece can be gripped more appropriately. In addition, since the folded parts are elastically deformed, a wide range is allowed in the space between the folded parts where the plate-shaped part is held. As a result, a wide range is allowed in the thickness of the plate-shaped part that can be gripped.

In the workpiece gripping device, it is preferable that: a depth direction of the slit may be defined along the protruding direction of the extension part; and a width of the slit may become smaller from a bottom part side to an opening side in the depth direction. In this case, the opening side of each inner wall surface of the slit is mainly brought into contact with the extension part housed in the slit, and a state where the extension parts are close to each other can be maintained effectively. As a result, the plate-shaped part of the workpiece can be gripped more appropriately.

In the workpiece gripping device, it is preferable that a wall part that forms the slit may be configured to be elastically deformed in a width direction of the slit. In this case, since the wall part that forms the slit is bent, the gripping member and the holding member can move relative to each other smoothly, and a wide range is allowed in the width of the slit so that a wide range can be allowed in the thickness the plate-shaped part that can be gripped.

In the workpiece gripping device, it is preferable that a projection may be formed on one of an inner wall surface of the slit and a sliding surface of each of the extension parts that slide relative to each other, and a guide part may be formed on another thereof and extend along a sliding direction of the inner wall surface and the sliding surface in order to guide the projection that is inserted therein. In this case, the holding member and the gripping member can be moved relative to each other easily along the sliding direction with a simple structure in which the projection inserted in the guide part moves along the extending direction of the guide part.

In the workpiece gripping device, it is preferable that when each of the extension parts projects from the slit by a maximum length, one end surface of the guide part in an extending direction and the projection may be brought into contact with each other so as to prevent each of the extension parts from projecting any more. In this case, by a simple structure of the projection and the guide part, the gipping member can be prevented from falling from the slit.

In the workpiece gripping device, it is preferable that the gripping member may include a plurality of gripping members. In this case, a plurality of portions of the plate-shaped part of the workpiece can be gripped between the extension parts of the plurality of gripping members. As a result, the plate-shaped part of the workpiece can be gripped more appropriately.

In the workpiece gripping device, it is preferable that when an edge part of the plate-shaped part inserted between the extension parts projecting from the slit is in contact with the base part, the gripping member and the holding member may be configured to move relative to each other in a direction where the extension parts are housed in the slit. In this case, by moving the gripping member and the holding member relative to each other with a simple structure, the plate-shaped part of the workpiece can be gripped between the extension parts.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF DRAWINGS

FIG. 5 is a perspective view in which the workpiece gripping device in FIG. 1 grips a workpiece in a different shape; and FIG. 6 is a cross-sectional view of a main part of the workpiece gripping device and the workpiece in FIG. 5.

DESCRIPTION OF EMBODIMENTS

A preferred embodiment of a workpiece gripping device according to the present invention will be described in detail with reference to the attached drawings.

Figure 1:
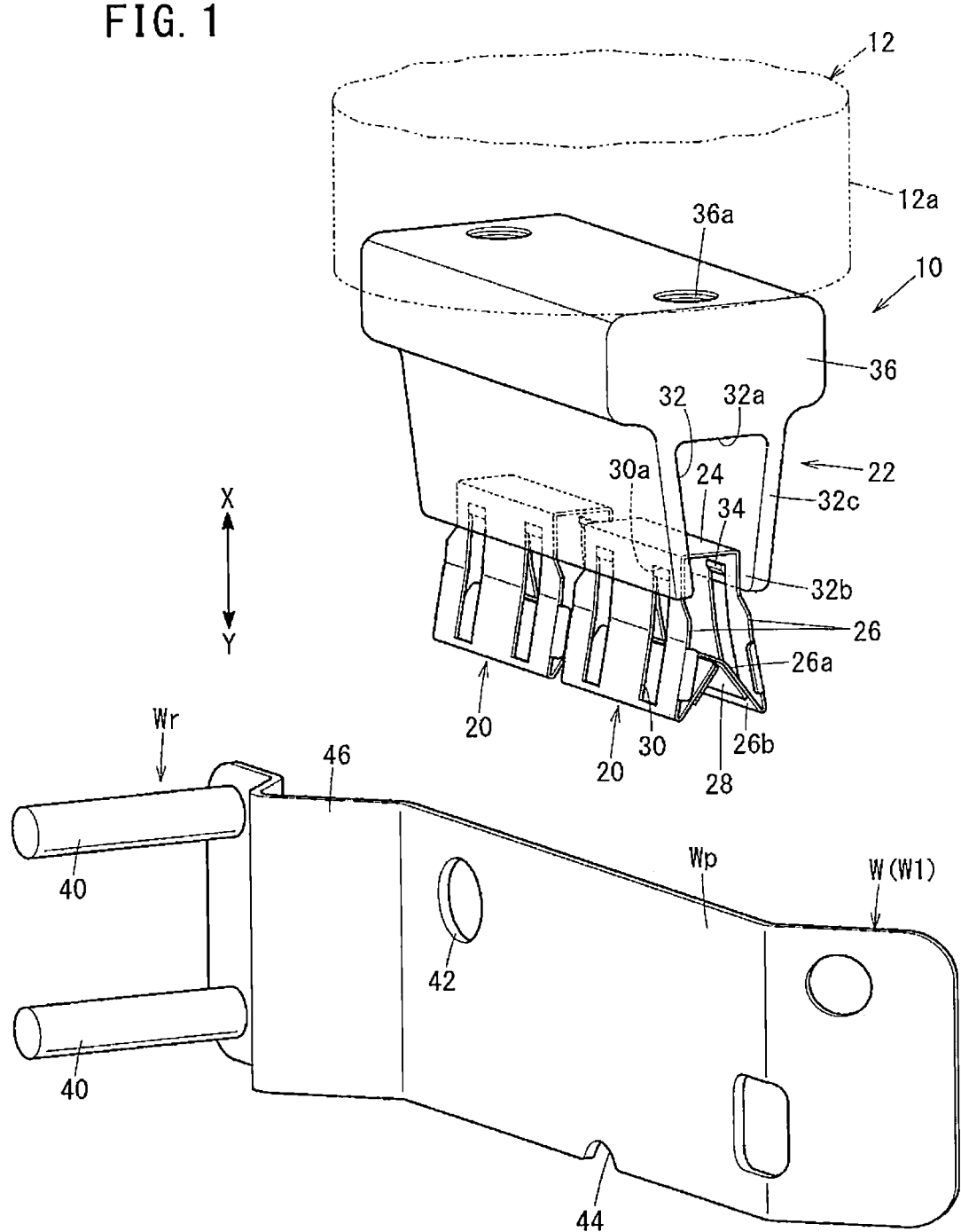
FIG. 1 is a perspective view of a workpiece gripping device according to an embodiment of the present invention, and a workpiece that is to be gripped.

A workpiece gripping device 10 according to the present embodiment illustrated in FIG. 1 is what is called a robot hand that is attached to a robot 12 and used. By the use of the robot 12 with the workpiece gripping device 10 attached, a workpiece W is taken out of a predetermined place (such as a pallet where a plurality of workpieces W are housed or placed), and transported to another place (for example, another component to which the workpiece W is assembled).

The robot 12 to which the workpiece gripping device 10 is attached is, for example, an articulated arm type robot including an arm with a plurality of joints or a Cartesian coordinate robot including two or three orthogonal slide axes (what is called gantry robot). In FIG. 1, the workpiece gripping device 10 is attached to a tip end part 12a of the robot 12.

The workpiece gripping device 10 includes, for example, two gripping members 20 and one holding member 22 in order to grip the workpiece W including a flat plate-shaped part Wp in at least a part thereof. In the present embodiment, the two gripping members 20 are formed to have the similar structure, and each gripping member 20 includes a base part 24 and a pair of extension parts 26 that protrude or extend from the base part 24. In the description below, a base part 24 side from which the extension part 26 protrudes (arrow-X direction side in FIG. 1, etc.) is also referred to as a base end side, and a side opposite to the base part 24 (arrow-Y direction side in FIG. 1, etc.) is also referred to as a tip end side.

The gripping member 20 is formed by an integral formation of the base part 24 and the extension parts 26 using a material of sheet metal, resin, or the like. Therefore, the gripping member 20 is elastically deformable so that the tip end sides of the extension parts 26 approach each other or are separated from each other. Specifically, when the gripping member 20 is elastically deformed, the tip end sides of the pair of extension parts 26 can approach each other (see FIG. 4). On the other hand, when the gripping member 20 is not elastically deformed (non-energized state), the tip end sides of the pair of extension parts 26 remain separated from each other with a space where the plate-shaped part Wp of the workpiece W can be inserted (see FIG. 2). The extension parts 26 include portions that extend to incline from the base part 24 so that the space therebetween is larger on the tip end side than on the base end side in the non-energized state. By setting the inclination angle of the extension parts 26, for example, the distance between the tip end sides of the extension parts 26 can be easily adjusted.

Figure 2:
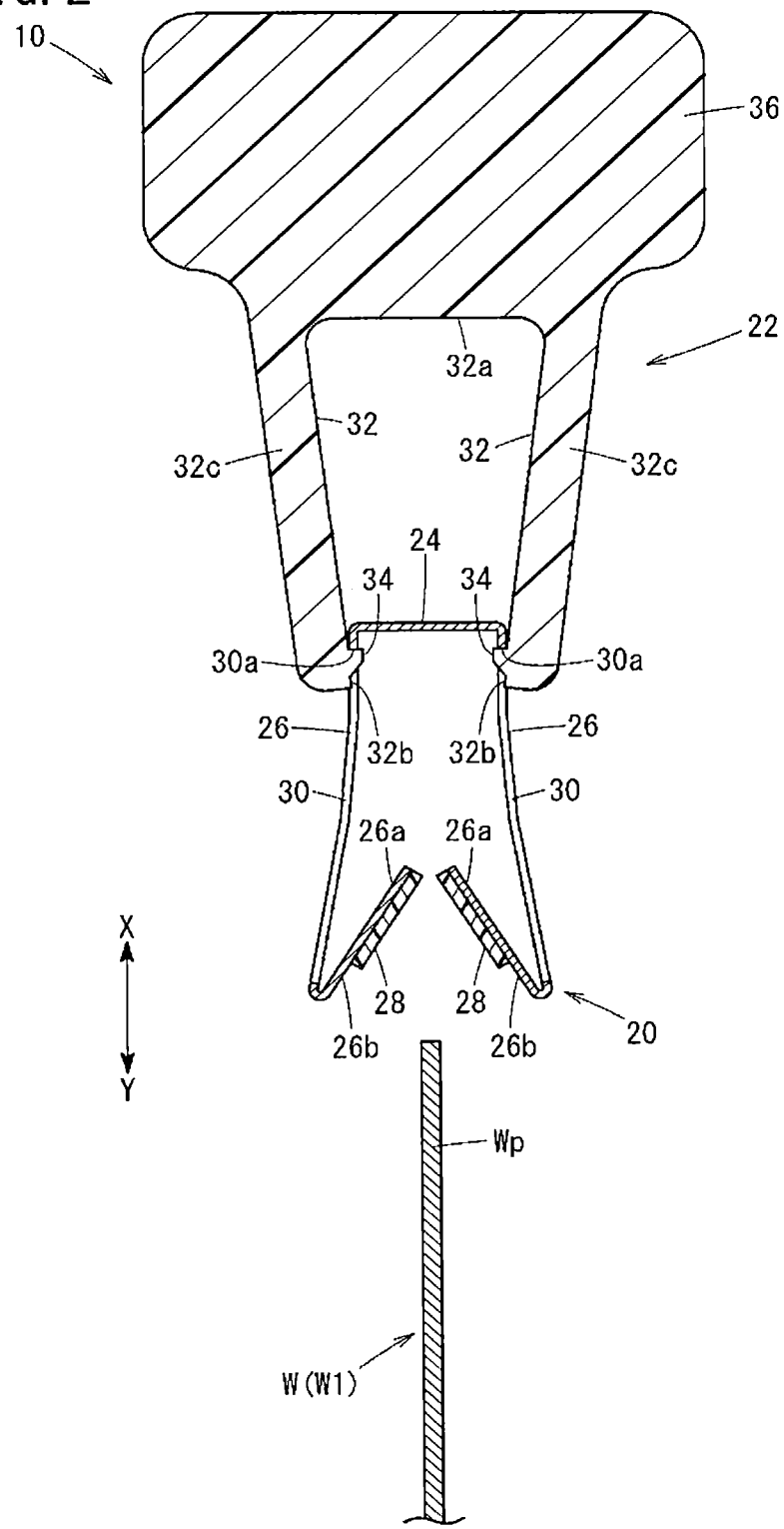
FIG. 2 is a cross-sectional view of a main part of the workpiece gripping device and the workpiece in FIG. 1.

Each of the tip end sides of the pair of extension parts 26 includes a folded part 26a that extends toward a space between the extension parts 26. The folded parts 26a of the pair of extension parts 26 extend to approach each other from the tip end side (arrow-Y direction side) to the base end side (arrow-X direction side), and are elastically de-formable in a direction where the folded parts 26a are separated from each other. That is to say, as illustrated in FIG. 1 and FIG. 2, each of the folded parts 26a is provided to form a shape like a letter of V with the tip end side of the extension part 26 in the non-energized state. In addition, each of the folded parts 26a is elastically deformable in a direction where a space between the folded part 26a and the tip end side of the extension part 26 that form a V-shape becomes smaller.

Each of surfaces 26b of the folded parts 26a that face each other is provided with a slip preventing part 28 that includes a plate-shaped rubber, for example. As described below, the extension parts 26 can grip (clip) the plate-shaped part Wp through the slip preventing part 28 (see FIG. 3 and FIG. 4). Therefore, the slip preventing part 28 may have a structure where a friction force generated between the extension part 26 and the plate-shaped part Wp can be increased. Thus, the slip preventing part 28 is not limited to the plate-shaped rubber or the like. For example, the slip preventing part 28 may be partially provided as a plurality of protrusions, lines, or the like with respect to the surface 26b of the folded part 26a, or may be formed of other material than rubber.

Each of the extension parts 26 includes a guide part 30 that includes a notch extending along the protruding direction. Note that, instead of the notch, the guide part 30 may include a concave part that extends along the protruding direction, for example.

The holding member 22 includes, for example, a material of metal, resin, or the like, and includes a slit 32 for holding the gripping member 20 slidably in the direction in which the extension part 26 protrudes. As illustrated FIG. 1, the two gripping members 20 are arranged along an extending direction of the slit 32. As illustrated FIG. 3 and FIG. 4, the holding member 22 houses at least parts of the extension parts 26 in the slit 32 against an elastic force of the gripping member 20. Thus, a state where the extension parts 26 are close to each other can be maintained. On the other hand, as illustrated in FIG. 1 and FIG. 2, at least parts of the extension parts 26 project from the slit 32. Thus, a state where the extension parts 26 remain separated from each other can be maintained.

A depth direction of the slit 32 is along the direction in which the extension part 26 protrudes and the width of the slit 32 becomes smaller from a bottom part 32a side to an opening 32b side in the depth direction. Wall parts 32c that form the slit 32 are elastically deformable in a width direction of the slit 32. Therefore, the extension parts 26 housed in the slit 32 against an elastic force of the wall parts 32c can be elastically energized in a direction where the extension parts 26 approach each other.

A tip end side of each wall part 32c is provided with a projection 34 that is inserted into the guide part 30 of the extension part 26. When the projection 34 moves in the guide part 30 along an extending direction of the guide part 30, the gripping member 20 and the holding member 22 can be moved relative to each other along a sliding direction (direction in which extension part 26 protrudes).

As illustrated in FIG. 1 and FIG. 2, when the extension part 26 projects from the slit 32 by the maximum length, one end surface 30a of the guide part 30 in the extending direction and the projection 34 are brought into contact with each other. This can prevent the extension part 26 from projecting from the slit 32 by more than the maximum length; therefore, the gripping member 20 can be prevented from falling from the slit 32.

A base end side of the holding member 22 relative to the slit 32 is provided with a thick part 36 to attach the workpiece gripping device 10 to the tip end part 12a of the robot 12. The workpiece gripping device 10 and the tip end part 12a are fixed by screws through an insertion hole 36a (see FIG. 1) that is provided in the thick part 36, for example.

Next, an operation of the workpiece gripping device 10 according to the present embodiment structured as above will be described.

Description will hereinafter be made of examples in which the workpieces W with different shapes are gripped by the workpiece gripping device 10. One example is illustrated in FIG. 1 to FIG. 4 (may be referred to as "workpiece W1"). The other example is illustrated in FIG. 5 and FIG. 6 (may be referred to as "workpiece W2"). The workpieces W1 and W2 are plate-shaped members that are formed by sheet metal processing, for example. As illustrated in the drawings, the workpieces W1 and W2 include at least a plate-shaped part Wp with a flat shape. However, the workpieces W1 and W2 may also include a part Wr other than the plate-shaped part Wp (for example, bolt 40). The part Wr is not limited to the bolt 40 and may be a block-shaped part.

The workpiece W1 illustrated in FIG. 1 to FIG. 4 includes a through hole 42 that penetrates the plate-shaped part Wp in a thickness direction, a notch 44 that is formed on an edge part of the plate-shaped part Wp, and a bending part 46 with a V-shape that is formed on one end side in a longitudinal direction of the plate-shaped part Wp. The workpiece W2 illustrated in FIG. 5 and FIG. 6 includes a bending part 48 with an L-shape that is formed on each side in the longitudinal direction of the plate-shaped part Wp. The plate-shaped part Wp of the workpiece W2 is a little thicker than the plate-shaped part Wp of the workpiece W1.

When the workpiece W1 is gripped, as illustrated in FIG. 1 and FIG. 2, first, the two gripping members 20 and the holding member 22 are moved relative to each other so that the extension parts 26 of the gripping members 20 project from the slit 32. Therefore, the space between the extension parts 26 can be set so that the plate-shaped part Wp of the workpiece W1 can be inserted into the space between the extension parts 26.

Next, the workpiece gripping device 10 is moved by the robot 12 so that the plate-shaped part Wp of the workpiece W1 is inserted into the space between the extension parts 26 from the tip end side to the base end side. As described above, the distance between the extension parts 26 is larger toward the tip end side. Therefore, the plate-shaped part Wp can be easily inserted from the tip end side to the base end side of the extension part 26.

Figure 3:
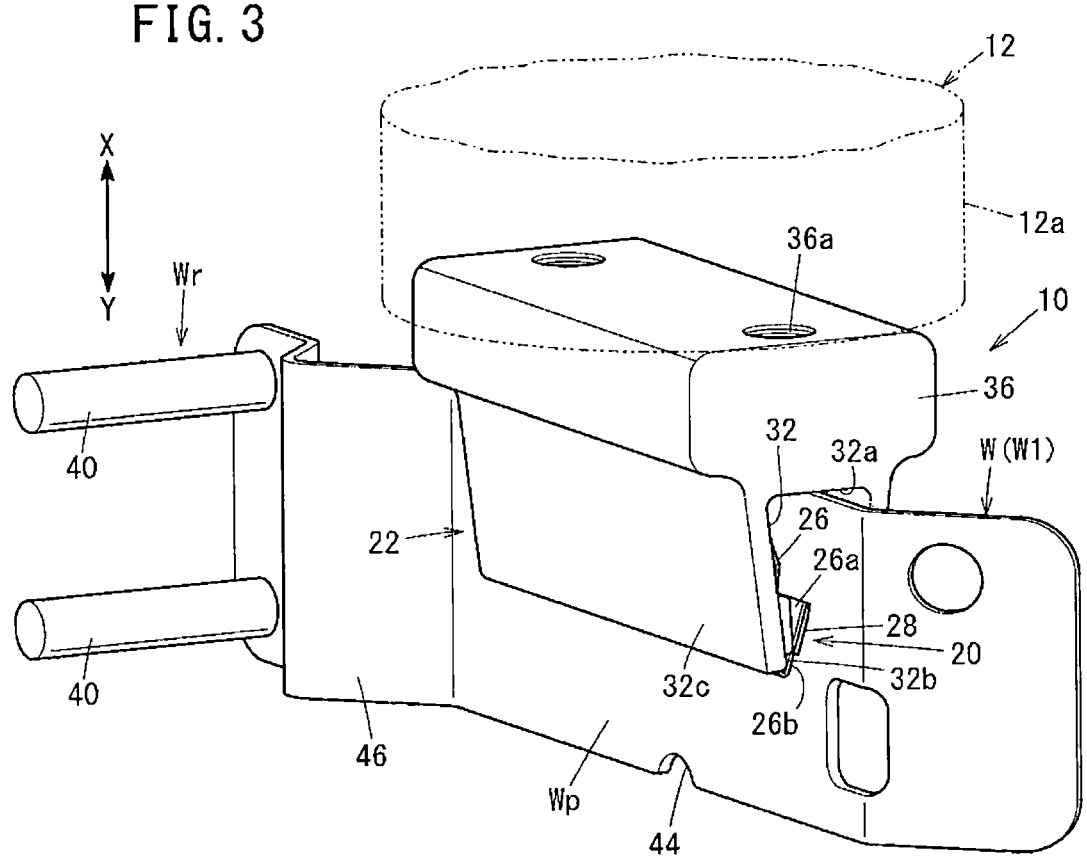
FIG. 3 is a perspective view in which the workpiece gripping device in FIG. 1 grips the workpiece.
Figure 4:
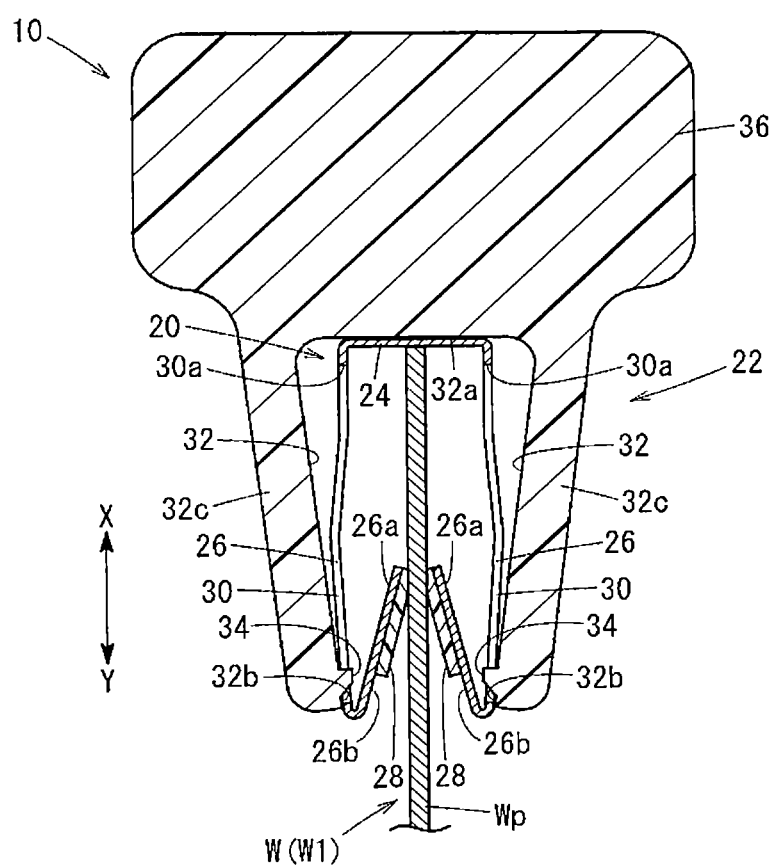
FIG. 4 is a cross-sectional view of a main part of the workpiece gripping device and the workpiece in FIG. 3.

When the plate-shaped part Wp is inserted into the space between the extension parts 26, the edge part of the plate-shaped part Wp is brought into contact with the base part 24. When the plate-shaped part Wp is inserted further, as illustrated in FIG. 3 and FIG. 4, the gripping member 20 that is pressed by the plate-shaped part Wp moves relative to the holding member 22.

Thus, an inner wall surface of the slit 32 on the opening 32b side that is narrower than that of the slit 32 on the bottom part 32a side and a side surface (sliding surface) of the extension part 26 that faces the inner wall surface slide. Along with this sliding, the projection 34 moves along the extending direction in the guide part 30. As a result, the extension part 26 is housed in the slit 32 along the protruding direction. Note that, in the present embodiment, as illustrated in FIG. 4, the gripping member 20 and the holding member 22 are moved relative to each other until the base part 24 of the gripping member 20 is brought into contact with the bottom part 32a of the slit 32.

Thus, when the extension parts 26 are housed in the slit 32, the wall parts 32c of the slit 32 on the opening 32b side energize the extension parts 26 in a direction where the tip end sides of the extension parts 26 approach each other, in other words, a direction where the tip end sides of the extension parts 26 are pressed to the plate-shaped part Wp. As described above, the width of the slit 32 is smaller on the opening 32b side than on the bottom part 32a side. Therefore, the wall parts 32c on the opening 32b side are mainly brought into contact with the tip end sides of the extension parts 26, and a state where the tip end sides of the extension parts 26 are close to each other can be maintained appropriately.

When the tip end side of the extension part 26 is pressed to the plate-shaped part Wp, the folded part 26a is elastically deformed in a direction where the space between the folded part 26a and the tip end side of the extension part 26 that form the V-shape becomes smaller. Thus, the folded part 26a energizes the slip preventing part 28 to the direction of pressing the plate-shaped part Wp. As a result, the plate-shaped part Wp of the workpiece W1 can be gripped between a pair of slip preventing parts 28 of the extension parts 26 appropriately.

After the workpiece gripping device 10 grips the workpiece W1, the robot 12 to which the workpiece gripping device 10 is attached transports the workpiece W1 to a predetermined place. Then, a state where the workpiece W1 is gripped can be maintained appropriately by a friction force generated between the plate-shaped part Wp and the slip preventing part 28.

For example, the notch 44 of the workpiece W1 is engaged to a counterpart component, a tool or the like (not shown) at a transport destination of the workpiece W1. In this state, the workpiece gripping device 10 is moved relative to the workpiece W1 in a separating direction. In this movement, as described above, the friction force is generated between the plate-shaped part Wp and the slip preventing part 28; therefore, in addition to the workpiece W1, the gripping member 20 can be moved relative to the holding member 22. This can make the extension parts 26 project from the slit 32. Thus, the distance between the extension parts 26 becomes larger, and the gripped plate-shaped part Wp can be released.

Note that, how to release the gripped plate-shaped part Wp is not limited to a particular method. For example, the workpiece gripping device 10 may further include a releasing means (not shown) for releasing the workpiece W autonomously regardless of the shape of the workpiece W, the shape of the transport destination, or the like. One example of the releasing means is a through hole (not shown) that penetrates the thick part 36 and opens at the bottom part 32a of the slit 32, and an actuator including a piston rod (neither are shown) that moves forward and backward in the through hole. The number of through holes and the number of piston rods are equal to the number of gripping members 20, and by moving the piston rods forward in the through holes, the base parts 24 of the gripping members 20 can be pressed along a depth direction of the slit 32.

Then, in a state where the piston rods of the actuator are retracted, the workpiece gripping device 10 grips the plate-shaped part Wp and transports the workpiece W to the predetermined place as described above. After that, the piston rods are moved forward to press the gripping members 20, so that the gripping members 20 move relative to the holding member 22 to project the extension parts 26 from the slit 32. Thus, the distance between the extension parts 26 becomes larger and the gripped plate-shaped part Wp can be released.

As illustrated in FIG. 5 and FIG. 6, the workpiece gripping device 10 can grip the plate-shaped part Wp of the workpiece W2 by an operation similar to that of the workpiece W1. That is to say, not only the workpiece W1 and the workpiece W2 but also other workpieces W including the plate-shaped part Wp can be transported to a predetermined place when the plate-shaped part Wp is gripped in a manner similar to that of the workpiece W1.

As illustrated FIG. 6, the thickness of the plate-shaped part Wp of the workpiece W2 is larger than the thickness of the plate-shaped part Wp of the workpiece W1. Therefore, when the workpiece gripping device 10 grips the workpiece W2, the wall parts 32c of the slit 32 can be elastically deformed largely to outside in the width direction. Similarly, since the thickness of the plate-shaped part Wp is large, the folded part 26a can be elastically deformed so that the space between the tip end side of the extension part 26 and the folded part 26a that form the V-shape becomes much smaller.

Therefore, even if the thickness of the plate-shaped part Wp of the workpiece W2 is large, the workpiece W2 can be gripped between the extension parts 26 appropriately, and this is similar to the case of the workpiece W1. That is to say, in a range where the wall parts 32c and the folded parts 26a are elastically deformable, the plate-shaped part Wp with different thicknesses can be gripped appropriately.

The present invention is not limited to the aforementioned embodiment, and various modifications can be employed without departing from the gist of the present invention.

For example, in the workpiece gripping device 10 according to the embodiment, the gripping member 20 includes the base part 24 and the extension parts 26 that are formed by the integral formation using the material of the sheet metal, the resin, or the like. However, the present invention is not limited to this example. The base part 24 and the extension parts 26 may be formed separately.

In the workpiece gripping device 10, in order to simplify the structure, the extension parts 26 approach each other or are separated from each other by elastically deforming the gripping member 20 or setting the gripping member 20 to the non-energized state. However, the present invention is not limited to this example. The extension parts 26 may approach each other or be separated from each other by a known hinge mechanism (not shown) or the like.

In the workpiece gripping device 10, on the inside of one slit 32, the two gripping members 20 with the same structure are held. However, the number of gripping members 20 may be one, or may be two or more. The workpiece gripping device 10 may include a plurality of gripping members 20 with different structures. Moreover, for example, the holding member 22 may include a plurality of slits 32 with different widths.

For example, even if the plate-shaped part Wp of the workpiece W includes portions with different thicknesses, the entire plate-shaped part Wp can be gripped appropriately by employing the gripping members 20 that can grip workpieces with different thicknesses or the slits 32 with different widths in accordance with such portions with different thicknesses.

That is to say, when the number of gripping members 20 and slits 32, the arrangement of the gripping members 20 and the slits 32, the distance between the extension parts 26 of the gripping members 20, the folding angle of the folded part 26a, the shape of the slit 32, or the like is set in accordance with the shape etc. of the plate-shaped part Wp, for example, the workpiece gripping device 10 can grip various workpieces W.

In the workpiece gripping device 10, the extension part 26 is provided with the guide part 30 and the wall part 32c of the slit 32 is provided with the projection 34. However, the extension part 26 may be provided with the projection 34 and the wall part 32c of the slit 32 may be provided with the guide part 30.

The workpiece gripping device 10 is attached to the tip end part 12a of the robot 12 directly. However, the workpiece gripping device 10 may be attached to the tip end part 12a through an actuator (not shown) of a cylinder unit or the like.

The invention claimed is:

1. A workpiece gripping device attached to a robot and used for gripping a workpiece, the workpiece including a plate-shaped part in at least a part thereof, the device comprising:
    a gripping member including a pair of extension parts that protrude from a base part and face each other with a space therebetween where the plate-shaped part of the workpiece is configured to be inserted, the gripping member configured to be deformed so that at least parts of the extension parts approach each other or are separated from each other; and
    a holding member including a slit configured to hold the gripping member slidably along a direction in which the extension parts protrude, the holding member configured to make the extension parts approach each other by housing at least parts of the extension parts in the slit, and make the extension parts be separated from each other by projecting at least parts of the extension parts from the slit,
    wherein the plate-shaped part is configured to be gripped between the extension parts that have approached each other,
    wherein each of the extension parts of the pair includes a part where a distance between the extension parts is larger toward a tip end side in the protruding direction when the pair of extension parts is projected from the slit.

2. The workpiece gripping device according to claim 1, wherein each of the extension parts includes a slip preventing part on a part configured to grip the plate-shaped part.

3. The workpiece gripping device according to claim 1, wherein:
    the gripping member is configured to be elastically deformed so that the extension parts approach each other or are separated from each other; and
    the extension parts are configured to approach each other when at least parts of the extension parts are housed in the slit against an elastic force of the gripping member.

4. The workpiece gripping device according to claim 1, wherein:
    a tip end side of each of the extension parts of the pair in the protruding direction is provided with a folded part that is folded to the space between the extension parts;
    the folded pans of the pair of extension parts extend in a direction of approaching each other from the tip end side to a base end side in the protruding direction, and are configured to be elastically deformed in a direction where the folded parts are separated from each other; and
    the plate-shaped part is configured to be gripped between the folded pans.

5. The workpiece gripping device according to claim 1, wherein:
    a depth direction of the slit is defined along the protruding direction of the extension part; and
    a width of the slit becomes smaller from a bottom part side to an opening side in the depth direction.

6. The workpiece gripping device according to claim 5, wherein a wall part that forms the slit is configured to be elastically deformed in a width direction of the slit.

7. The workpiece gripping device according to claim 1, wherein a projection is formed on one of an inner wall surface of the slit and a sliding surface of each of the extension parts that slide relative to each other, and a guide part is formed on another thereof and extends along a sliding direction of the inner wall surface and the sliding surface in order to guide the projection that is inserted therein.

8. The workpiece gripping device according to claim 7, wherein when each of the extension parts projects from the slit by a maximum length, one end surface of the guide part in an extending direction and the projection are brought into contact with each other so as to prevent each of the extension parts from projecting any more.

9. The workpiece gripping device according to claim 1, wherein the gripping member comprises a plurality of gripping members.

10. The workpiece gripping device according to claim 1, wherein when an edge part of the plate-shaped part inserted between the extension parts projecting from the slit is in contact with the base part, the gripping member and the holding member are configured to move relative to each other in a direction where the extension parts are housed in the slit.

* * * * *